US008902585B2

(12) United States Patent
Tseng et al.

(10) Patent No.: US 8,902,585 B2
(45) Date of Patent: Dec. 2, 2014

(54) PORTABLE COMPUTER

(71) Applicant: Wistron Corporation, New Taipei (TW)

(72) Inventors: Tien-Chung Tseng, New Taipei (TW);
Ming-Ju Hsieh, New Taipei (TW);
Chien-Yuan Lai, New Taipei (TW);
Wei-Yi Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 230 days.

(21) Appl. No.: 13/679,068

(22) Filed: Nov. 16, 2012

(65) Prior Publication Data

US 2013/0141855 A1    Jun. 6, 2013

Related U.S. Application Data

(60) Provisional application No. 61/561,312, filed on Nov. 18, 2011.

(30) Foreign Application Priority Data

Aug. 20, 2012   (TW) .............................. 101130175 A

(51) Int. Cl.
*G06F 1/16* (2006.01)
(52) U.S. Cl.
CPC ............ *G06F 1/1607* (2013.01); *G06F 1/1613* (2013.01); *G06F 1/1616* (2013.01); *G06F 1/1681* (2013.01)
USPC ............. 361/679.55; 361/679.09; 361/679.26
(58) Field of Classification Search
USPC ........................... 361/679.55, 679.09, 679.26
See application file for complete search history.

(56) References Cited

U.S. PATENT DOCUMENTS

| 5,085,394 | A | * | 2/1992 | Torii ............................ 248/455 |
| 5,168,426 | A | * | 12/1992 | Hoving et al. ........... 361/679.09 |
| 5,200,913 | A | * | 4/1993 | Hawkins et al. ......... 361/679.09 |
| 7,184,263 | B1 | * | 2/2007 | Maskatia ................. 361/679.27 |
| 8,233,276 | B2 | * | 7/2012 | Wu et al. .................. 361/679.55 |
| 8,248,788 | B2 | * | 8/2012 | Wu et al. .................. 361/679.55 |
| 8,248,789 | B2 | * | 8/2012 | Wu et al. .................. 361/679.56 |
| 8,315,044 | B2 | * | 11/2012 | Wu et al. .................. 361/679.02 |
| 8,654,520 | B2 | * | 2/2014 | Lin et al. ................... 361/679.27 |
| 2006/0077622 | A1 | | 4/2006 | Keely et al. |
| 2007/0030634 | A1 | | 2/2007 | Maskatia |
| 2010/0309612 | A1 | | 12/2010 | Liang et al. |

(Continued)

FOREIGN PATENT DOCUMENTS

| CN | 2174715 Y | 8/1994 |
| CN | 1784133 A | 6/2006 |

(Continued)

*Primary Examiner* — Lisa Lea Edmonds
(74) *Attorney, Agent, or Firm* — Muncy, Geissler, Olds & Lowe, P.C.

(57) ABSTRACT

A portable computer includes a base, a display module, at least one support element and at least one sliding assembly. The display module comprises a connecting end and a display face. Each support element comprises a first end pivoted on a portion of the display module other than the display face and a second end pivoted on the rear end of the base. Each sliding assembly comprises a slide rail disposed at least in the second area and a sliding element combined with the connecting end and moving along the slide rail. Each sliding element includes at least one sliding auxiliary structure for decreasing friction during sliding.

19 Claims, 16 Drawing Sheets

(56) References Cited

U.S. PATENT DOCUMENTS

| | | | |
|---|---|---|---|
| 2013/0127730 A1* | 5/2013 | Lee et al. | 345/169 |
| 2013/0128440 A1* | 5/2013 | Chen et al. | 361/679.09 |
| 2013/0128441 A1* | 5/2013 | Lee et al. | 361/679.09 |
| 2013/0128442 A1* | 5/2013 | Tseng et al. | 361/679.09 |
| 2013/0128443 A1* | 5/2013 | Tseng et al. | 361/679.12 |
| 2013/0329351 A1* | 12/2013 | Lin | 361/679.27 |

FOREIGN PATENT DOCUMENTS

| | | |
|---|---|---|
| TW | 566583 | 12/2003 |
| TW | 584227 | 4/2004 |
| TW | M243748 U | 9/2004 |
| TW | 200707220 | 2/2007 |
| TW | 200827832 A | 7/2007 |
| TW | M323952 | 12/2007 |
| TW | M367554 U1 | 10/2009 |

\* cited by examiner

PORTABLE COMPUTER

BACKGROUND OF THE INVENTION

1. Field of the Invention

The present relates to a portable computer, and more particularly, to a portable computer having a display that can move smoothly relative to a base.

2. Description of the Related Art

Computing devices have become an indispensable part of our daily life. With the fast development of touch technologies, most hand-held devices or electronic devices, such as tablet PCs, smart phones, and PDAs, now provide touch panels instead of a mouse or keyboard as input devices. These devices are equipped with operating systems supporting touch functions to enable intuitive and convenient operations.

As notebook PCs are usually equipped with QWERTY keyboards and touch pads for input functions and they also use operating systems which do not support touch functions or interfaces which cannot recognize touch gestures, few notebook PCs have provided touch functions or designs in the past. However, as software vendors are rolling out new operating systems that can support touch functions and people are becoming familiar with the touch gestures required to operate tablet PCs or smart phones, it is now necessary for manufacturers to provide touch functions on notebook PCs or even to transform their notebook PCs into tablet PCs.

Some prior art techniques disclose a support arm for supporting and pivotally connecting to the display screen. Generally, the display screen can be rotated by the dispositions and operations of connecting mechanisms, such as pivoting elements, linkage elements, and sliding elements. Whether the connecting mechanisms are composed of linkage rods or sliding blocks in conjunction with slide rails, it is necessary to rotate the display screen by interactions of those elements of the connecting mechanism. When a user moves one of those elements, the movement of those elements results in friction between them. If there is not any buffer element or auxiliary sliding device disposed between those elements to reduce the friction, those elements in the connecting mechanisms could become worn after the connecting mechanisms are operated repeatedly, and the wear on the pieces could influence the rotation of the display screen. This may cause inconvenience for the user.

Therefore, it is necessary to provide a portable computer having an auxiliary sliding device for reducing the friction of a connecting mechanism to drive a display screen to be rotated.

SUMMARY OF THE INVENTION

It is an object of the present invention to provide a portable computer having a display that can move smoothly relative to a base.

To achieve the above object, a portable computer of the present invention comprises a base, a display module, at least one supporting element, and at least one sliding assembly. The base, between a front end and a rear end, comprises a first area disposed at a front side of the base and a second area disposed at a rear side of the base. The display module comprises a connecting end, a display face, and a support plane opposite to the display face; each supporting element comprises a first fixed end and a second fixed end. The first fixed end is pivotally connected to a portion of the display module other than the display face such that the display module can rotate relative to the supporting element; the second fixed end is pivotally connected to the rear side or a proximity of the rear end of the base such that the supporting element can rotate relative to the base. Each sliding assembly comprises a sliding element, a sliding guide structure and at least one auxiliary sliding device. The sliding guide structure is disposed at least in the second area of the base. The sliding element is combined to the connecting end of the display module and can slide along the sliding guide structure. The at least one auxiliary sliding structure is disposed between at least one side of the sliding element and at least one side of the sliding guide structure such that the at least one side of the sliding element does not directly contact the at least one side of the sliding guide structure and friction between the sliding element and the sliding guide structure is thereby reduced.

Through the design of the present invention, when the display module is moved relative to the base, the friction formed by the sliding element sliding along the sliding guide structure can be reduced such that the display module can be moved relative to the base smoothly.

DETAILED DESCRIPTION OF THE PREFERRED EMBODIMENT

The advantages and innovative features of the invention will become more apparent from the following detailed description of the preferred embodiments when taken in conjunction with the accompanying drawings.

Figure 1:
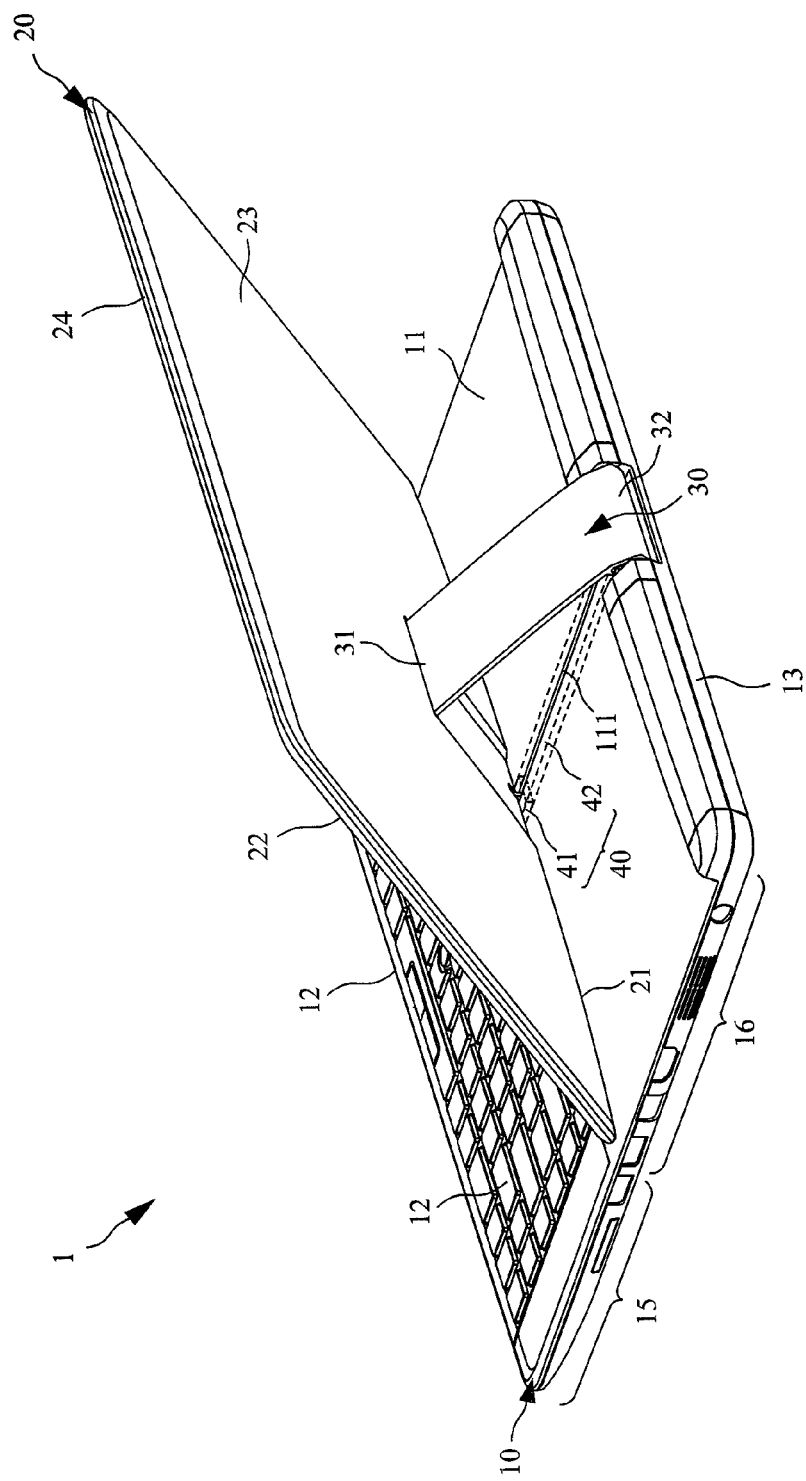
FIG. 1 illustrates a partial view of a portable computer of the present invention.
Figure 2:
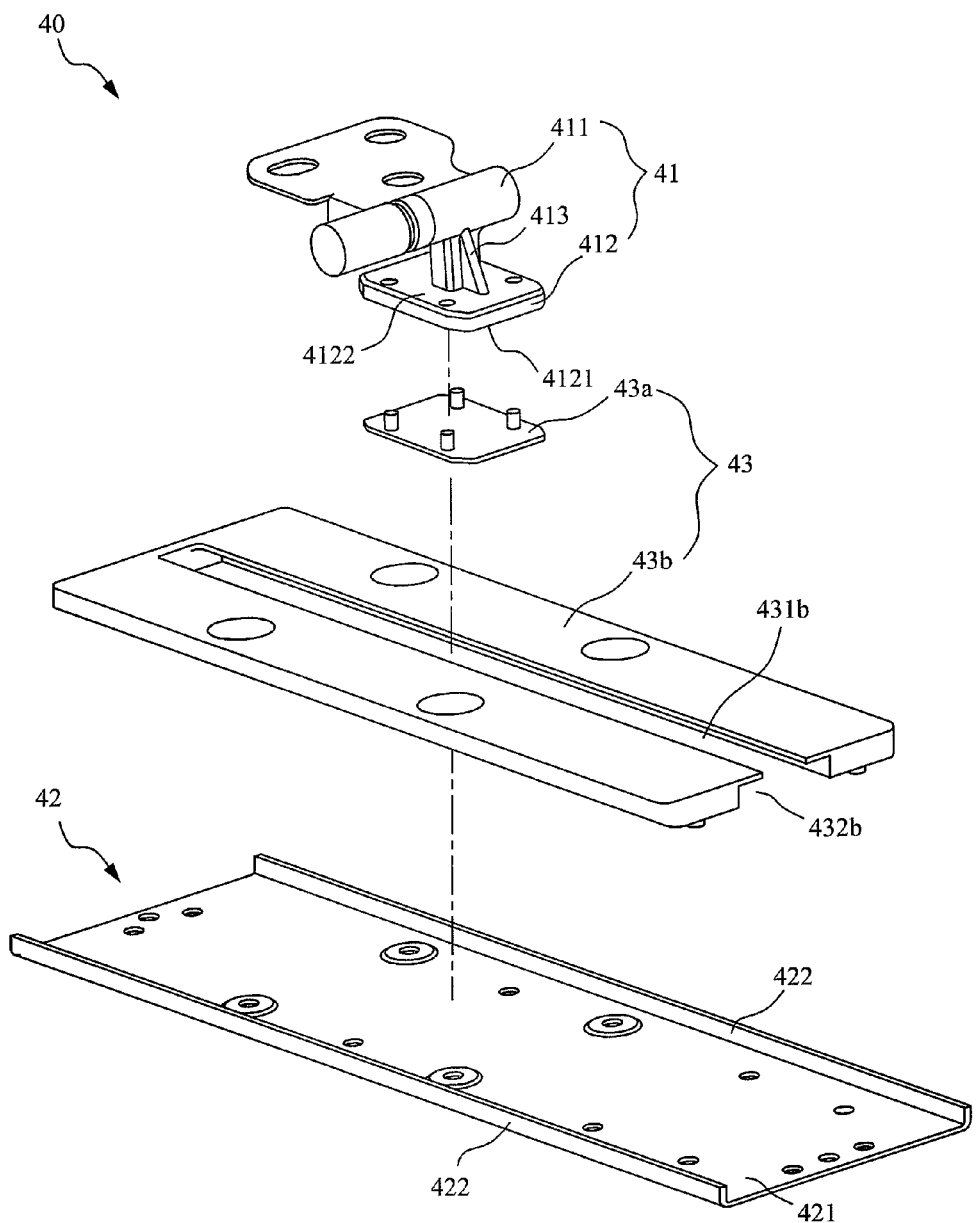
FIG. 2 illustrates an exploded view of a first embodiment of a sliding assembly of the present invention.
Figure 3:
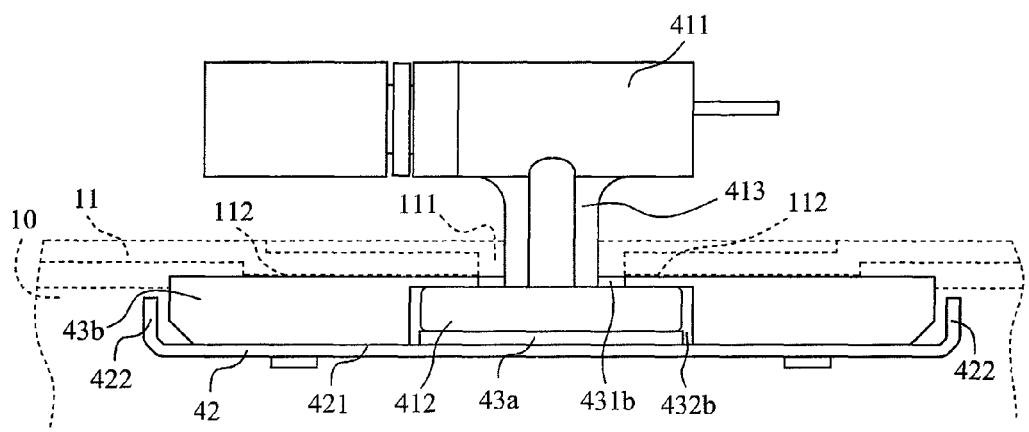
FIG. 3 illustrates a lateral view of the first embodiment of combining a base and the sliding assembly.

Please refer to FIG. 1 to FIG. 3. FIG. 1 illustrates a partial view of a portable computer 1 of the present invention; FIG. 2 illustrates an exploded view of a first embodiment of a sliding assembly 40 of the present invention; FIG. 3 illustrates a lateral view of the first embodiment of combining a base 10 and the sliding assembly 40. In an embodiment of the present invention, the portable computer 1 is a notebook PC, but according to various types of applications, the portable computer 1 can be a tablet PC, a mini laptop, or other electronic devices with rotatable display modules, but it is not limited to this embodiment.

As shown in FIG. 1, the portable computer 1 of the present invention comprises a base 10, a display module 20, a supporting element 30 and a sliding assembly 40. Main computing components and related electronic components are disposed at the interior of the base 10. The base 10 comprises a plane 11, a front end 13 and a rear end 14. The plane 11 of the base 10 is segmented into a first area 15 and a second area 16 between a front end 13 and a rear end 14; the first area 15 is disposed near the front end 13, and the second area 16 is disposed near the rear end 14. The first area 15 is provided for disposing a keyboard 12 or/and other input devices, such as a touch pad or track point. The plane 11 further comprises a slit 111 and an under surface (not shown, see FIG. 3). The base 10 is made of aluminum magnesium alloy, but the base 10 can also be made of other metal materials, such as aluminum, magnesium, zinc, or other alloy materials. The present invention is not limited thereto.

The display module 20 comprises a connecting end 21, a display face 22, a support plane 23, and a free end 24. The display face 22 is disposed opposite to the support plane 23, and the connecting end 21 is opposite to the free end 24. The display module 20 is pivotally connected to a sliding element 41 at the connecting end 21 via hinges or bearing elements to form a rotatable pivot point and to enable the display module 20 to rotate relative to the sliding element 41. The display module 20 can have a display screen disposed at the display face 22 and supporting touch functions for receiving touch inputs from the user.

The supporting element 30 comprises a first fixed end 31 and a second fixed end 32, and the first fixed end 31 can be pivotally connected to the support plane 23 of the display module 20 via hinges to form a rotatable pivot point such that the display module 20 can rotate relative to the supporting element 30; the second fixed end 32 can be pivotally connected to the rear end 14 of the base 10 via hinges to form another rotatable pivot point such that the supporting element 30 is able to rotate relative to the base 10.

As shown in FIG. 1 and FIG. 2, the sliding assembly 40 is disposed at least in the second area 16 of the base 10. In other suitable embodiments, the sliding assembly 40 can extend forward to a part or all of the first area 15. It is noted that the sliding assembly 40 can be disposed in a central portion of the second area 16 or a substantially central portion of the second area 16. The sliding assembly 40 comprises the sliding element 41, a sliding guide structure 42 and at least one auxiliary sliding device 43. The sliding element 41 is combined with the connecting end 21 of the display module 20. The sliding element 41 combines sliding and pivotally connecting functions, and the sliding element 41 can slide along the sliding guide structure 42 relative to the base 10. Furthermore, the sliding element 41 is made of aluminum magnesium alloy. In this embodiment, at least a part of the auxiliary sliding device 43 is made of a material with a high surface slip property, such as self-lubricating polyoxymethylene (POM), nylon, plastic, etc. The friction between the material with a high surface slip property and a hard material (such as metal) is lower than the friction between two hard materials. Accordingly, the at least one auxiliary sliding device 43 made of the material with a high surface slip property is disposed between the hard sliding element 41 and the hard sliding guide structure 42 such that the hard sliding element 41 does not directly contact the hard sliding guide structure 42. The friction formed by the sliding element 41 sliding along the sliding guide structure 42 can thus be reduced so that the display module 20 can be moved relative to the base 10 smoothly.

As shown in FIG. 2 and FIG. 3, the sliding element 41 comprises a pivoting portion 411, a sliding portion 412, and a connecting portion 413; the connecting end 21 of the display module 20 is rotatably pivoted to the sliding element 41 via the pivoting portion 411. The sliding portion 412 is connected to the pivoting portion 411 via the connecting portion 413, and the sliding guide structure 42 is provided for disposing the sliding portion 412 of the sliding element 41. In this embodiment, the sliding guide structure 42 comprises a bottom surface 421 and two internal side surfaces 422 (the two internal side surfaces 422 are symmetrical), and two opposite sides of each internal side surface 422 are respectively connected to the bottom surface 421 and the under surface 111 of the plane 11 of the base 10 to form a groove-like space for disposing the sliding portion 412. Therefore, the sliding portion 412 can move within the groove-like space. In this embodiment, the sliding portion 412 is a block structure having a size fitted to the groove-like space such that the sliding portion 412 can slide within the sliding guide structure 122.

As shown in FIG. 1 and FIG. 3, to comply with the consistency and the sense of design of the portable device 1, the sliding guide structure 42 is disposed below the plane 11 of the base 10 and corresponds to the position of the slit 111 such that it is hidden. The structure of the sliding element 41 corresponds to the slit 111 of the plane 11 such that a width of the slit 111 is smaller than the sliding portion 412 and not smaller than a thickness of the connecting portion 413. Thereby, the connecting portion 413 of the sliding element 41 can go through and move along the slit 111 and allows the pivoting portion 411 to protrude out of the plane 11 of the base 10 such that the connecting end 21 of the display module 20 and the exposed pivoting portion 411 can be pivotally connected to each other.

As shown in FIG. 2 and FIG. 3, according to the first embodiment of the present invention, an outer surface of the sliding portion 412 comprises a bottom face 4121 and a top face 4122, and the at least one auxiliary sliding device 43 comprises a first auxiliary sliding device 43a and a second auxiliary sliding device 43b. The first auxiliary sliding device 43a is a bottom cover structure combined with the bottom face 4121 of the sliding portion 412; the second auxiliary sliding device 43b is a sleeve structure disposed into the sliding guide structure 42 (the groove-like space). The second auxiliary sliding device 43b has a sliding groove 431b and a sliding recess 432b. The sliding groove 431b corresponds to the disposed position of the slit 111. The sliding recess 432b is disposed under the sliding groove 431b and communicated with the sliding groove 431b, and a height and a width of the sliding recess 432b are equal to a thickness and a width of the sliding portion 412 combined with the first auxiliary sliding device 43a. Therefore, the sliding portion 412 combined with the first auxiliary sliding device 43a can be disposed within the sliding recess 432b and can slide.

Furthermore, the second auxiliary sliding device 43b is connected to at least one of the two internal side surfaces 422 of the sliding guide structure 42 and the under surface 112 of the plane 11. Thus the second auxiliary sliding device 43b can be fixed with the sliding guide structure 42, and the space of the sliding recess 432b can be closed. Accordingly, when the sliding portion 412 slides in the sliding guide structure 42, the sliding portion is prevented from directly contacting the sliding guide structure 42 and the plane 11 of the base 10 (which has a higher friction coefficient) by the first auxiliary sliding device 43a and the second auxiliary sliding device 43b (which has a lower friction coefficient). The sliding portion 412 of the sliding element 41 can slide within the sliding guide structure 42 smoothly.

It should be noted that, for preventing friction caused by direct contact between the sliding element 41 and the plane 10 and the sliding guide structure 42, the present invention provides different embodiments by changing the disposed position and number of the auxiliary sliding device 43 so that the friction formed by the sliding element 41 sliding within the sliding guide structure 42 can be reduced. The disposed positions and number of the auxiliary sliding devices 43 in different embodiments are further provided in the following descriptions.

Figure 4:
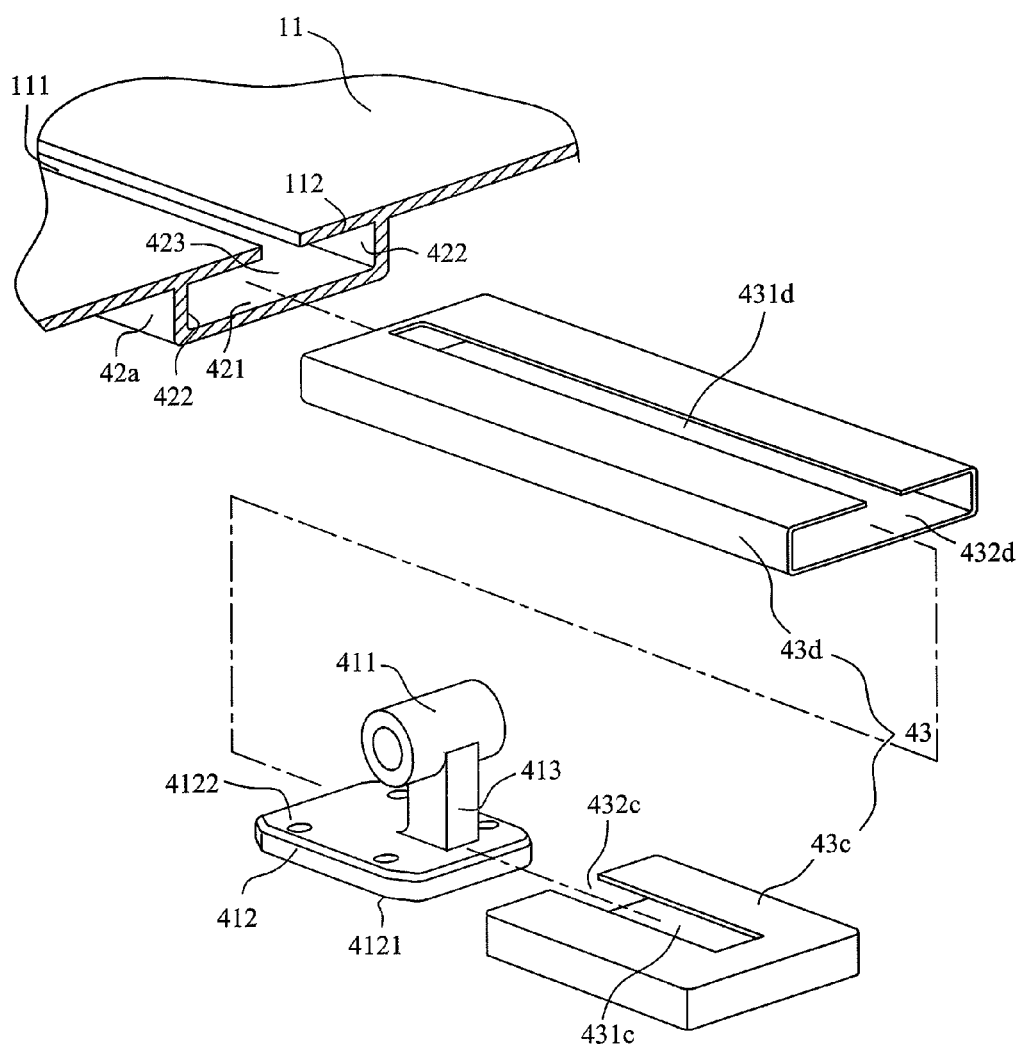
FIG. 4 illustrates an exploded view of a second embodiment of a base and a sliding assembly.
Figure 5:
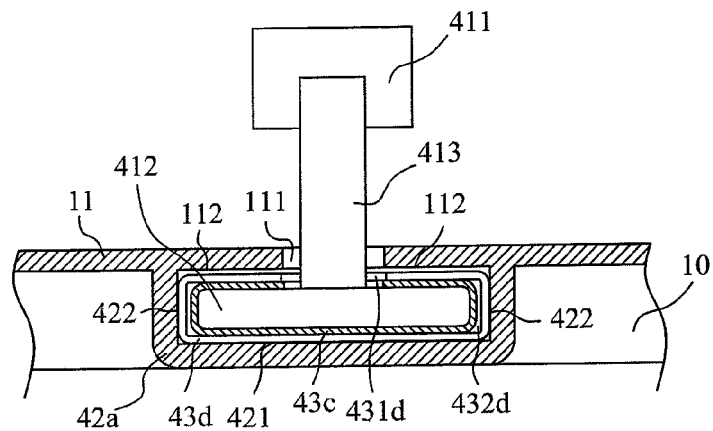
FIG. 5 illustrates a cross-sectional view of the second embodiment of the base and the sliding assembly.

Please refer to FIG. 4 and FIG. 5. FIG. 4 illustrates an exploded view of a second embodiment of a base 10 and a sliding assembly 40. FIG. 5 illustrates a cross-sectional view of the second embodiment of the base 10 and the sliding assembly 40. It is noted that the sliding guide structure 42a is integrated with the under surface 112 of the plane 11 of the base 10 in the following embodiments, but the present invention is not limited thereto.

The second embodiment is a variation of the first embodiment previously mentioned. As shown in FIG. 4 and FIG. 5, in the second embodiment of the base 10 and the sliding assembly 40, the at least one auxiliary sliding device 43 comprises a first auxiliary sliding device 43c and a second auxiliary sliding device 43d. The first auxiliary sliding device 43c is a sleeve structure disposed onto the outer surface of the sliding portion 412. More clearly, the first auxiliary sliding device 43c has a recess 431c for disposing the sliding portion 412, and one side of the recess 431c has an opening 432c receiving the sliding portion 412 into the recess 431c. Therefore, at least one side of the sliding portion 412 close to the second auxiliary sliding device 43d can be covered by the first auxiliary sliding device 43c (as shown in FIG. 4, an upper side, a lower side, a left side and a right side are covered). The second auxiliary sliding device 43d is also a sleeve structure disposed into the sliding guide structure 42a (the groove-like space). A cross-section of the second auxiliary sliding device 43d forms substantially a C-shaped structure. The second auxiliary sliding device 43d has a sliding groove 431d and a sliding recess 432d. The sliding groove 431d corresponds to the disposed position of the slit 111. The sliding recess 432d is disposed under the sliding groove 431d and communicated with the sliding groove 431d, and a height and a width of the sliding recess 432b are equal to a thickness and a width of the sliding portion 412 combined with the first auxiliary sliding device 43c. Therefore, the sliding portion 412 combined with the first auxiliary sliding device 43c can be disposed within the sliding recess 432d and slid.

The second auxiliary sliding device 43d is connected to at least one of the bottom surface 421, the two internal side surfaces 422 of the sliding guide structure 42a, and the under surface 112 of the plane 11, such that the second auxiliary sliding device 43d can be fixed. In this embodiment, since the height and the width of the second auxiliary sliding device 43d are equal to the height and the width of a recess space 423 of the sliding guide structure 42a, the second auxiliary sliding device 43d can be inserted and fixed into the sliding guide structure 42a such that the second auxiliary sliding device 43d is connected to the bottom surface 421 and the two internal side surfaces 422 of the sliding guide structure 42a. Accordingly, the sliding portion 412 can slide within the sliding guide structure 42a by the first auxiliary sliding device 43c contacting with the second auxiliary sliding device 43d, such that the sliding portion 412 can slide within the sliding guide structure 42a smoothly.

Figure 6:
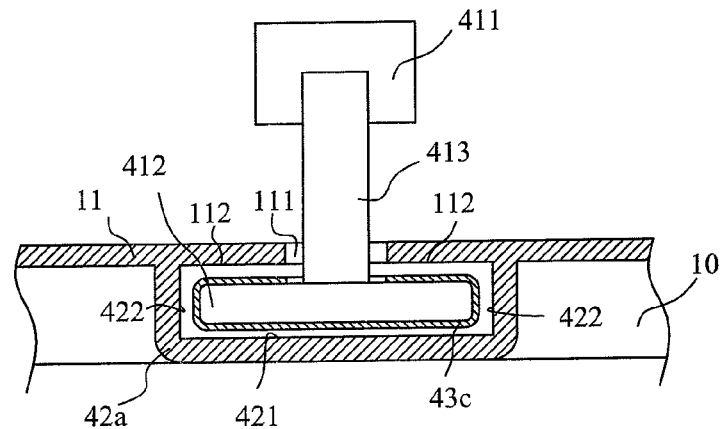
FIG. 6 illustrates a cross-sectional view of a third embodiment of a base and a sliding assembly.
Figure 7:
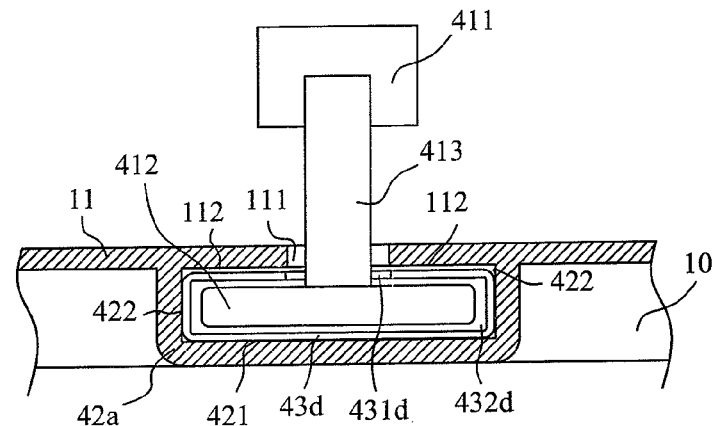
FIG. 7 illustrates a cross-sectional view of a fourth embodiment of a base and a sliding assembly.

Please refer to FIG. 6 and FIG. 7. FIG. 6 illustrates a cross-sectional view of a third embodiment of a base 10 and a sliding assembly 40. FIG. 7 illustrates a cross-sectional view of a fourth embodiment of a base 10 and a sliding assembly 40. The third and fourth embodiments are both variations of the second embodiment previously mentioned.

It should be noted that the disposition is limited to only the first auxiliary sliding device 43c combined with the sliding portion 412 or the second auxiliary sliding device 43d combined with the sliding guide structure 42a. Accordingly, the auxiliary sliding device with less friction can be disposed between the sliding portion 412 and the sliding guide structure 42a such that the sliding portion 412 can slide within the sliding guide structure 42a smoothly.

For example, as shown in FIG. 6, in the sliding assembly 40 of the third embodiment of the present invention, only the first auxiliary sliding device 43c is disposed on the outer surface of the sliding portion 412, and the second auxiliary sliding device is removed from the sliding guide structure 42a. Therefore, the sliding portion 412 can contact the sliding guide structure 42a by the first auxiliary sliding device 43c to reduce friction between the sliding portion 412 and the sliding guide structure 42a.

Oppositely, as shown in FIG. 7, in the sliding assembly 40 of the fourth embodiment of the present invention, only the second auxiliary sliding device 43d is disposed in the sliding guide structure 42a, and the first auxiliary sliding device is removed from the outer surface of the sliding portion 412. Therefore, the sliding portion 412 can directly contact the second auxiliary sliding device 43d rather than the sliding guide structure 42a so as to reduce friction between the sliding portion 412 and the sliding guide structure 42a.

Figure 8:
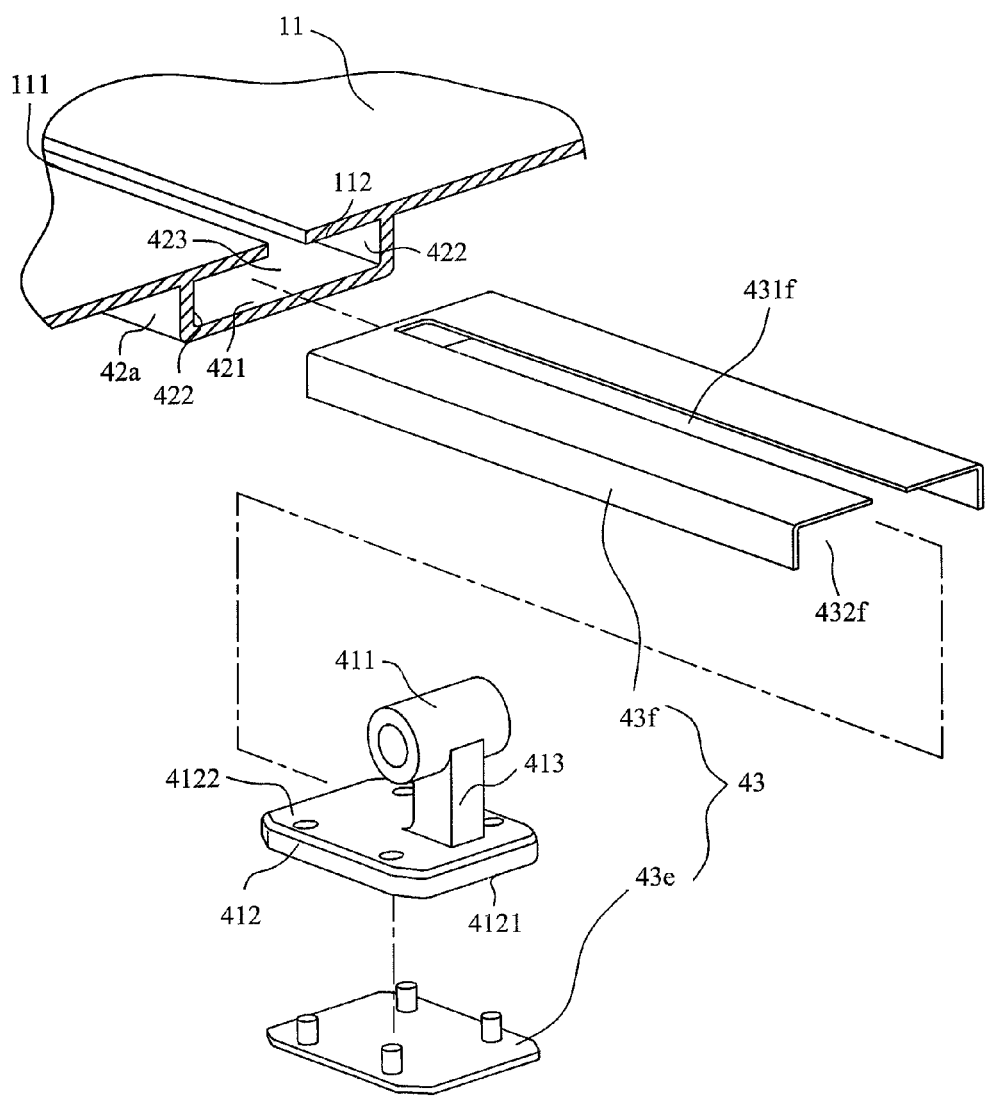
FIG. 8 illustrates an exploded view of a fifth embodiment of a base and a sliding assembly.
Figure 9:
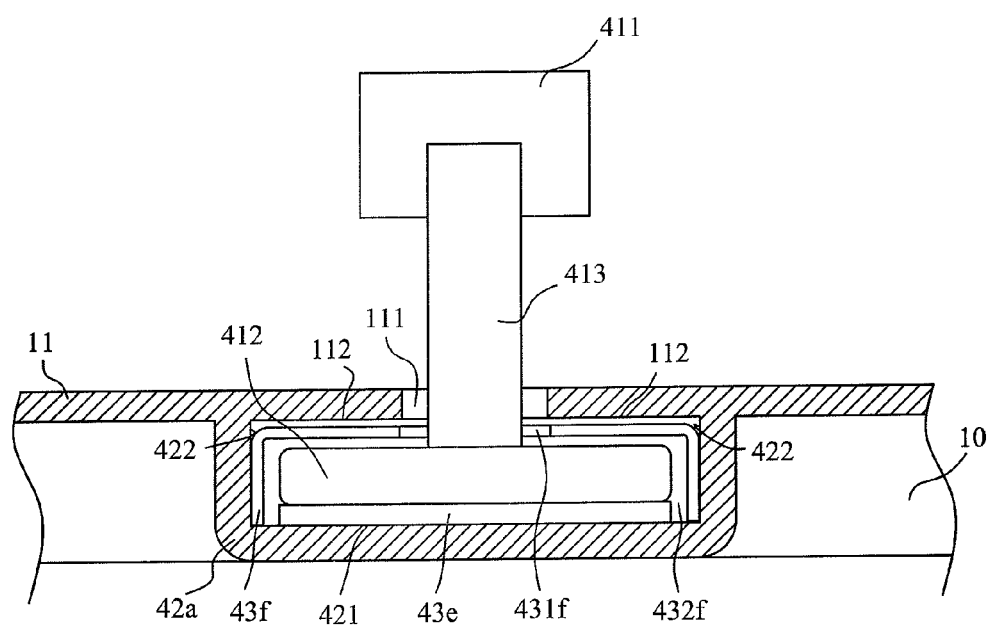
FIG. 9 illustrates a cross-sectional view of the fifth embodiment of the base and the sliding assembly.

Please refer to FIG. 8 and FIG. 9. FIG. 8 illustrates an exploded view of a fifth embodiment of a base 10 and a sliding assembly 40. FIG. 9 illustrates a cross-sectional view of the fifth embodiment of the base 10 and the sliding assembly 40.

The fifth embodiment is a variation of combining the first and the second embodiments previously mentioned. As shown in FIG. 8 and FIG. 9, in this embodiment, the at least one auxiliary sliding device 43 comprises a first auxiliary sliding device 43e and a second auxiliary sliding device 43f, and its structure corresponds to the sliding guide structure 42a integrated with the base 10. The first auxiliary sliding device 43e is a bottom cover structure combined with the bottom face 4121 of the sliding portion 412, and the second auxiliary sliding device 43f is a sleeve structure disposed into the sliding guide structure 42a. The second auxiliary sliding device 43f has a sliding groove 431f and a sliding recess 432f. The sliding groove 431f corresponds to the disposed position of the slit 111. The sliding recess 432f is disposed under the sliding groove 431f and communicated with the sliding groove 431f, and a height and a width of the sliding recess 432f are equal to a thickness and a width of the sliding portion 412 combined with the first auxiliary sliding device 43e. Therefore, the sliding portion 412 combined with the first auxiliary sliding device 43e can be disposed within the sliding recess 432f and slide therein. In this embodiment, since the height and the width of the second auxiliary sliding device 43f are equal to a height and a width of a recess space 423 of the sliding guide structure 42a, the second auxiliary sliding device 43f can be inserted into the sliding guide structure 42a and fixed. Therefore, the second auxiliary sliding device 43f is connected to at least one of the two internal side surfaces 422 of the sliding guide structure 42a, and to the under surface 112 of the plane 11. Accordingly, the sliding portion 412 does not directly contact the sliding guide structure 42a and/or the plane 11 of the base 10, so as to achieve the same function as the first embodiment.

Figure 10:
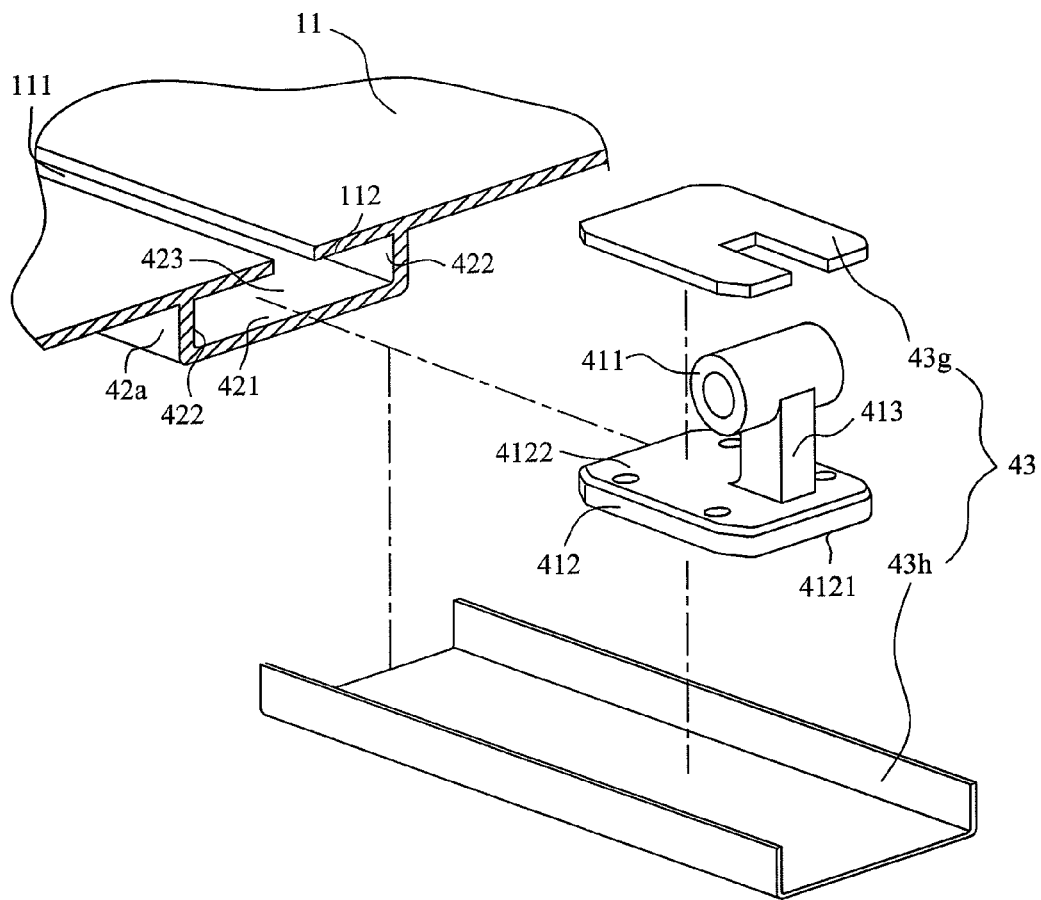
FIG. 10 illustrates an exploded view of a sixth embodiment of a base and a sliding assembly.
Figure 11:
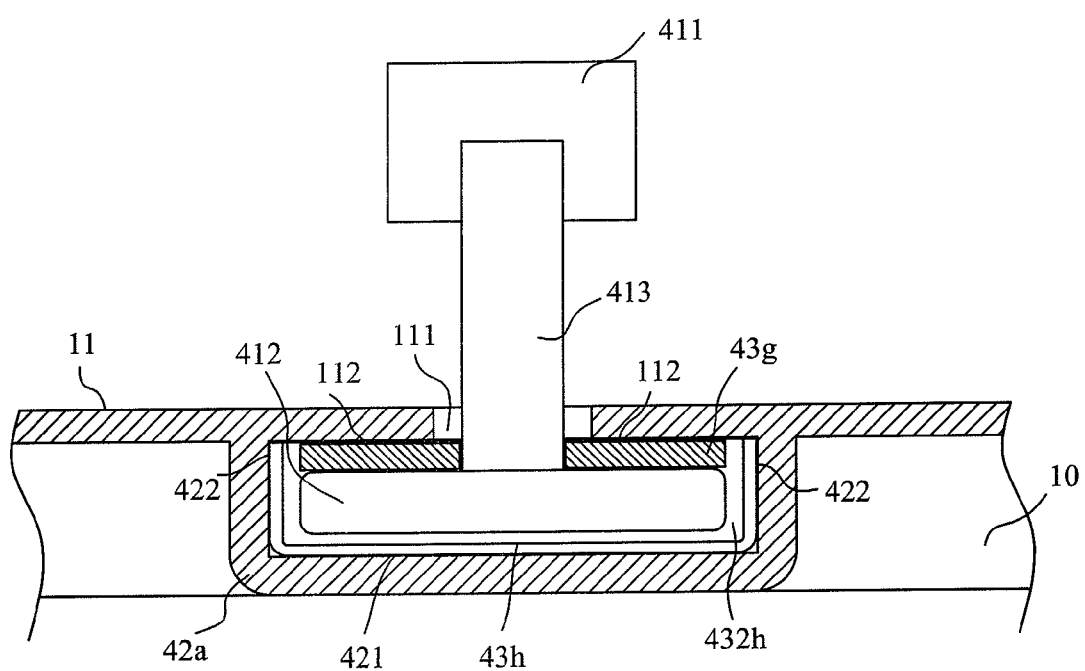
FIG. 11 illustrates a cross-sectional view of the sixth embodiment of the base and the sliding assembly.

Please refer to FIG. 10 and FIG. 11. FIG. 10 illustrates an exploded view of a sixth embodiment of a base and a sliding assembly. FIG. 11 illustrates a cross-sectional view of the sixth embodiment of the base and the sliding assembly.

The sixed embodiment is a variation of the fifth embodiment previously mentioned. As shown in FIG. 10 and FIG. 11, in this embodiment, the at least one auxiliary sliding device 43 comprises a first auxiliary sliding device 43g and a second auxiliary sliding device 43h, and its structure corresponds to the sliding guide structure 42a integrated with the base 10. The first auxiliary sliding device 43g is a top cover structure combined with the top face 4122 of the sliding portion 412, and the second auxiliary sliding device 43h is a sleeve structure disposed into the sliding guide structure 42a. The second auxiliary sliding device 43h has a sliding recess 432h, and a height and a width of the sliding recess 432h are equal to a thickness and a width of the sliding portion 412 combined with the first auxiliary sliding devices 43g. Therefore, the sliding portion 412 combined with the first auxiliary sliding device 43g can be disposed within the sliding recess 432g and slid. In this embodiment, since the height and the width of the second auxiliary sliding device 43h are equal to a height and a width of a recess space 423 of the sliding guide structure 42a, the second auxiliary sliding device 43h can be inserted into the sliding guide structure 42a and fixed. Therefore, the second auxiliary sliding device 43f is connected to at least one of the bottom surface and the two internal side surfaces 422 of the sliding guide structure 42a. Accordingly, the sliding portion 412 does not also directly contact the sliding guide structure 42a and/or the plane 11 of the base 10, so as to achieve the same function for reducing friction.

By different types of the auxiliary sliding devices of the present invention disposed between the sliding element and the sliding guide structure, the sliding element does not directly contact the sliding guide structure and/or the plane of the base; and the auxiliary sliding devices made of a material with a high surface slip property can reduce the friction formed by the sliding element sliding along the sliding guide structure such that the sliding device can function smoothly.

Figure 12A:
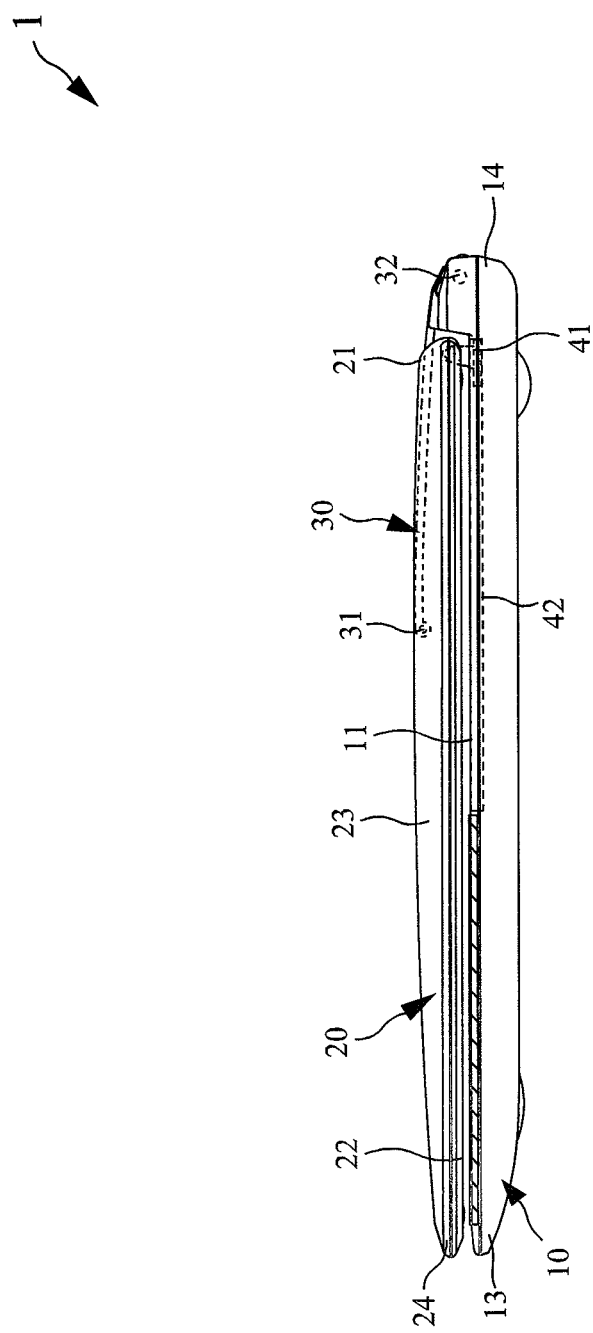
FIG. 12(a) illustrates a view of a first embodiment of the portable computer of the present invention in a closed state.
Figure 12B:
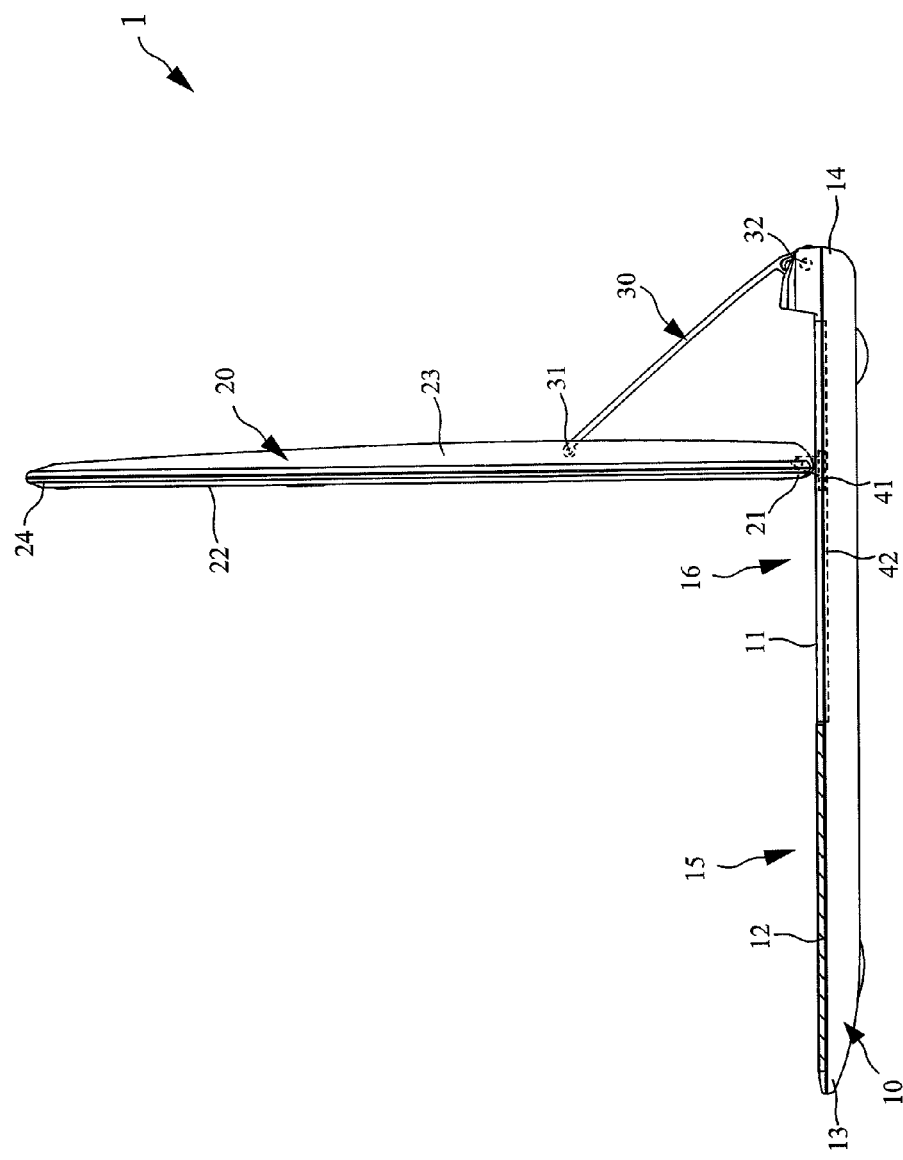
FIG. 12(b) illustrates a view of the first embodiment of the portable computer of the present invention switched to an open state from the closed state.
Figure 12C:
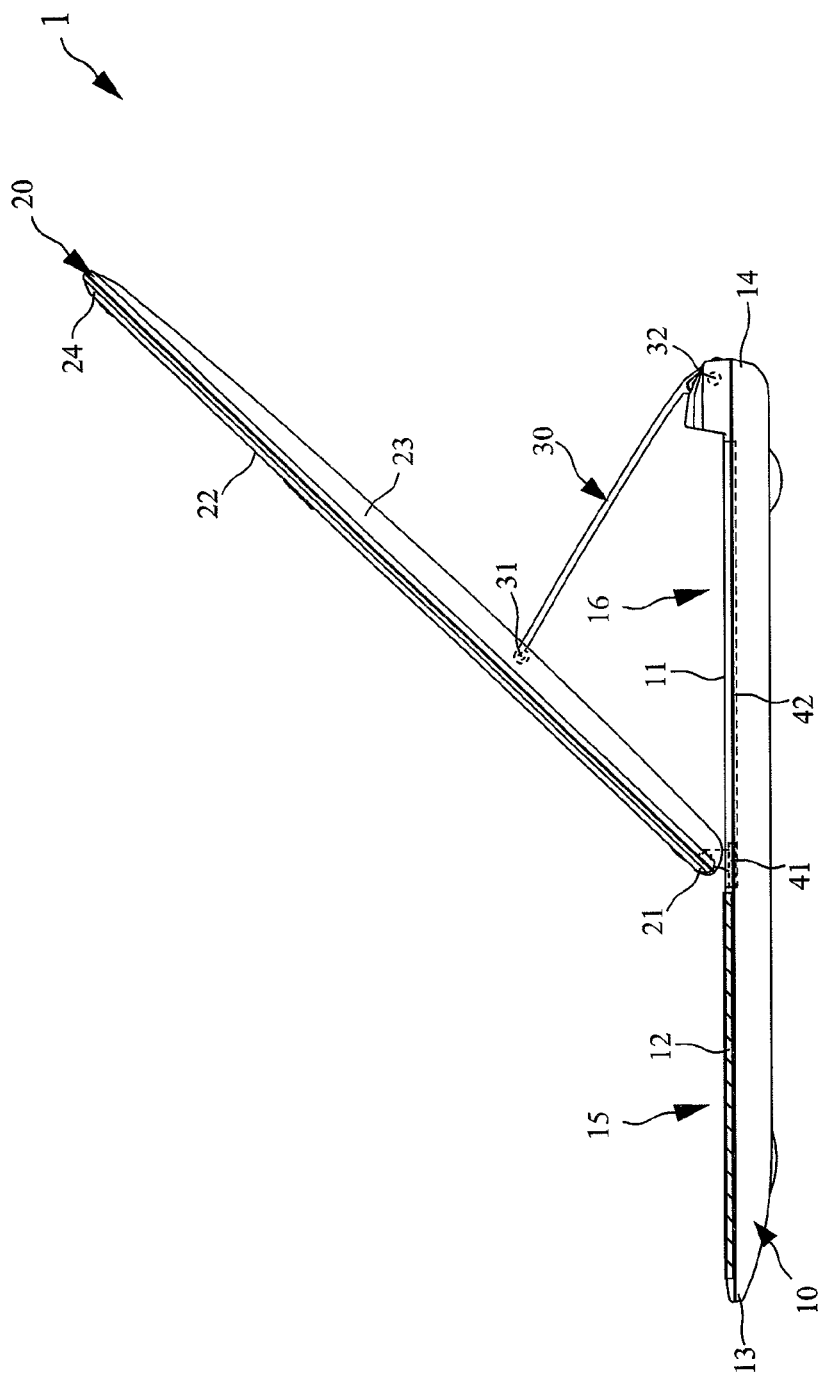
FIG. 12(c) illustrates a view of the first embodiment of the portable computer of the present invention in the open state.

Please refer to FIG. 12(a), FIG. 12(b), and FIG. 12(c). FIG. 12(a) illustrates a view of the first embodiment of the portable computer 1 in a closed state; FIG. 12(b) illustrates a view of the first embodiment of the portable computer 1 switched from the closed state to an open state; and FIG. 12(c) illustrates a view of the first embodiment of the portable computer in the open state. Please note that the structures and the operations of the portable computer 1 of the present invention are illustrated by the first embodiment of the present invention, but other embodiments of the present invention can be applied to execute the same operations; and it is not limited to the present embodiment.

As shown in FIG. 12(a), when the portable computer 1 is in a closed state, the display module 20 overlaps with the base 10 and is pivotally connected to the sliding element 41 via the connecting end 21. At this time, the display face 22 of the display module 20 is facing the base 10; the support element 30 also overlaps with the display module 20 and is pivotally connected to the rear end 13 of the base 10 and the display module 20 via the first fixed end 31 and the second fixed end 32 respectively. In this embodiment, when the portable computer 1 is in the closed state, the connecting end 21 of the display module 20 and the second fixed end 32 of the support element 30 are on different axes substantially parallel with each other, and the length of the support element 30 is longer than the distance between the connecting end 21 of the display module 20 and the first fixed end 31 of the support element 30. However, based on different design requirements, the portable computer 1, while in the closed state, can have the connecting end 21 of the display module 20 and the second fixed end 32 of the support element 30 on the same axis to let the support element 30 have a same length as the distance between the connecting end 21 of the display module 20 and the first fixed end 31 of the support element 30.

As shown in FIG. 12(b), when the user exerts a force on the free end 24 opposite to the connecting end 21 of the display module 20 to try to open the display module 20, at first the display module 20 rotates along with the support element 30 relative to the base 10 with the second fixed end 32 serving as a pivot point; after the display module 20 rotates to a certain angle, since the support element 30 has its length not smaller than the distance between the connecting end 21 of the display module 20 and the first fixed end 31 of the support element 30, the display module 20 can rotate relative to the support element 30 with the first fixed end 31 of the support element 30 serving as the pivot point; meanwhile, the display module 20 can rotate relative to the sliding element 41 with the connecting end 21 serving as the pivot point; and the sliding element 41 will drive the connecting end 21 of the display module 20 to slide from the second area 16 towards the first area 15.

As shown in FIG. 12(c), when the display module 20 continues to rotate with the first fixed end 31 of the support element 30 serving as the pivot point, and the sliding element 41 drives the connecting end 21 of the display module 20 to slide towards the first area 15 to a suitable position (such as the rear end of the keyboard module 12), then the portable computer 1 is in an open state. At this time, the display module 20 has rotated to a suitable angle relative to the base 10, with the display place 22 of the display module 20 facing the user. The display module 20 is supported by the support element 30 to form a tilted angle relative to the base 10.

Specifically, in the embodiments, the single sliding assembly 40 is disposed in the central position of the portable computer 1 and does not take up space on either side of the base 10 or on the display module 20. With this design, the user can use only one hand to hold the middle of the free end 24 of the display module 20, which corresponds to the position of the sliding assembly 40, to flip or slide the display module 20 smoothly. During this process, the display module 20 can maintain a stable sliding movement to facilitate operations. Furthermore, the user can initiate the opening process by flipping the display module 20 to let the display module 20 slide to a fixed position automatically, wherein the display module 20 is supported by the support element 30 to remain stable without shaking when the user performs touch operations on the display module 20.

In the previous embodiments, each portable computer 1 comprises a single support element 30 disposed at a central position relative to a sliding assembly 40 to achieve the object of the present invention. However, the present invention can have other implementations depending on different user requirements, effects, and mechanism designs, such that the number of the elements, the placement of the elements, and variations of the size, etc., should be view as included in the scope of the present invention. Please note that the sliding structures in each of the below embodiments of the portable computer is illustrated by the sliding assembly 40 of the first embodiment of the present invention, but the sliding assembly 40 can be any other sliding assembly or similar structures and is not limited to the present embodiment.

Figure 13A:
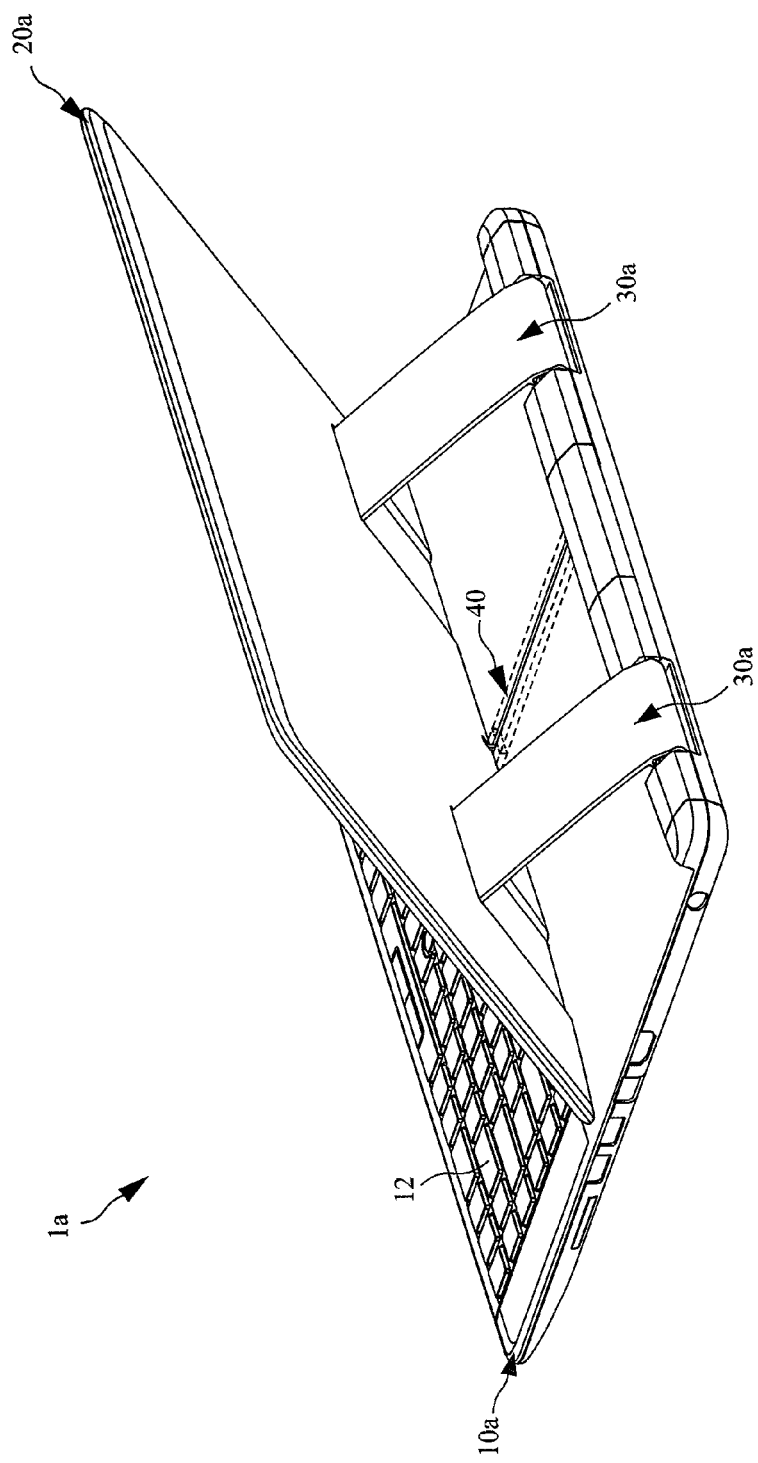
FIG. 13(a) illustrates a view of a second embodiment of the portable computer of the present invention.
Figure 13B:
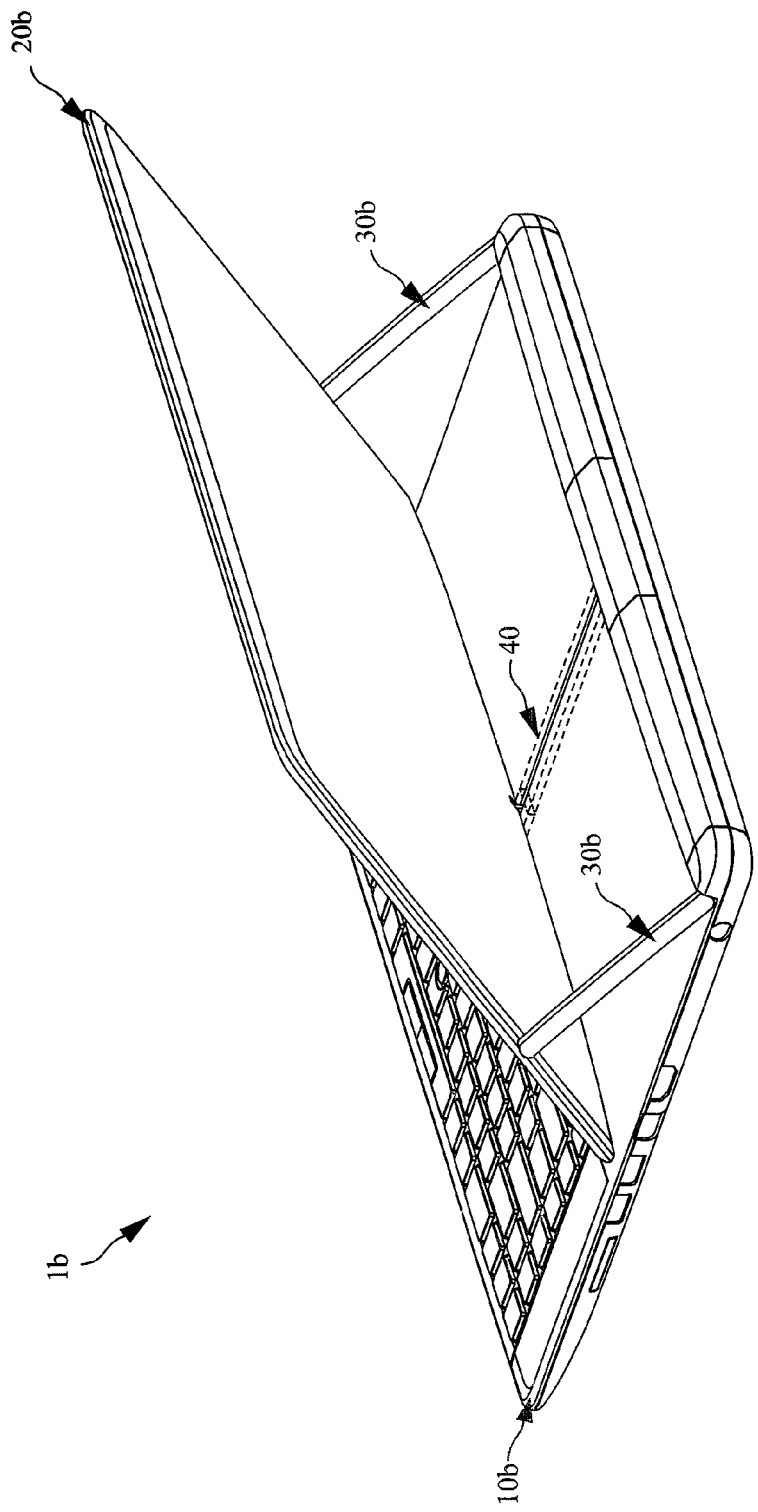
FIG. 13(b) illustrates a view of a third embodiment of the portable computer of the present invention.

For example, please refer to both FIG. 13(a) and FIG. 13(b). FIG. 13(a) illustrates a view of a second embodiment of the portable computer 1a of the present invention; FIG. 13(b) illustrates a view of a third embodiment of the portable computer 1b of the present invention. Alternatively, the portable computer can use more than one support element to support and stabilize the display module, wherein the support elements can be disposed at various positions. As shown in FIG. 13(a), in this embodiment, the portable computer 1a comprises two support elements 30a arranged in parallel and disposed at two sides of the central sliding assembly 40 respectively to form a symmetrical structure. Each support element 30a has its one end pivotally connected to a plane of the display module 20a other than the display face, and the other end pivotally connected to the rear end of the base. By adding additional support elements (point of support), the present invention can stably support the display module 20a in a sliding movement when it is opening or closing.

Also as shown in FIG. 13(b), this embodiment is a variation of the previous embodiment, wherein the portable computer 1b comprises two support elements 30b disposed at two opposite sides near the rear end; the support elements 30b are formed in a long stick-like shape and implemented as connecting rods for reducing the installation space and simplifying the assembling work, thereby enhancing the operations of the display module 20b. However, in other embodiments, the present invention can have various implementations for a plurality of support elements.

Figure 14:
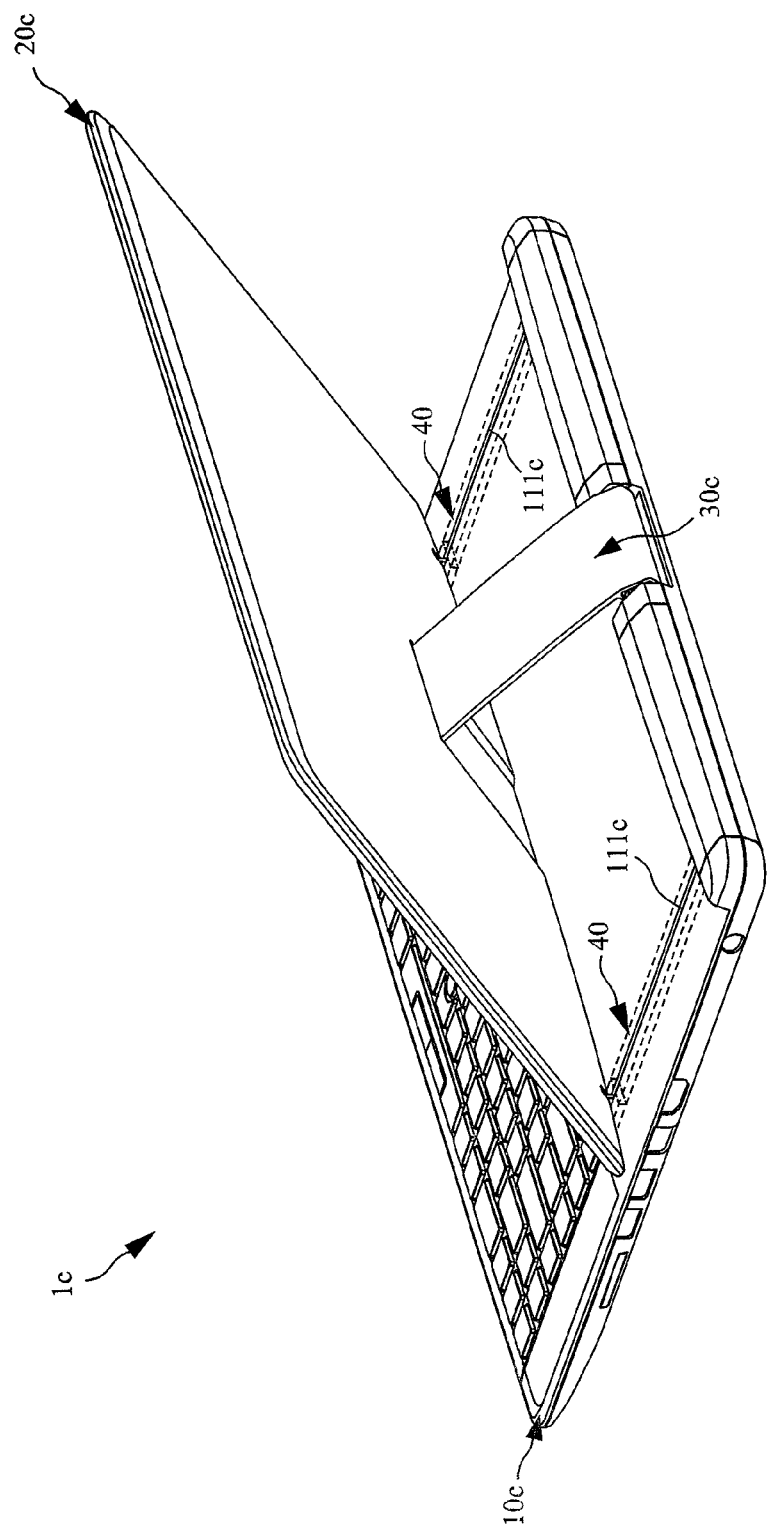
FIG. 14 illustrates a view of a fourth embodiment of the portable computer of the present invention.

Please refer to FIG. 14 for a view of a fourth embodiment of the portable computer 1c of the present invention. Alternatively, in addition to different implementations of the support element, the present invention also allows for adjustment the position of the sliding assembly and the number and positions of slits in the surface of the base to provide various functions. As shown in FIG. 14, in this embodiment, the portable computer 1c comprises two sliding assemblies 40 disposed at two sides of a single support element 30c respectively, and two slits 111c disposed at the base 10c to correspond to the two sliding assemblies 40, wherein the two sliding assemblies 40 and the two slits 111 c form a parallel symmetric structure. Therefore, when the display module 20c is opening or closing, the two sliding assemblies 40 can help to stabilize the sliding movement of the display module 20c.

Those skilled in the art can easily know that the three embodiments shown in FIG. 13(a) to FIG. 14 can be further combined to form a portable computer which comprises two support elements and two sliding assemblies; therefore, it will not be described in detail.

Figure 15:
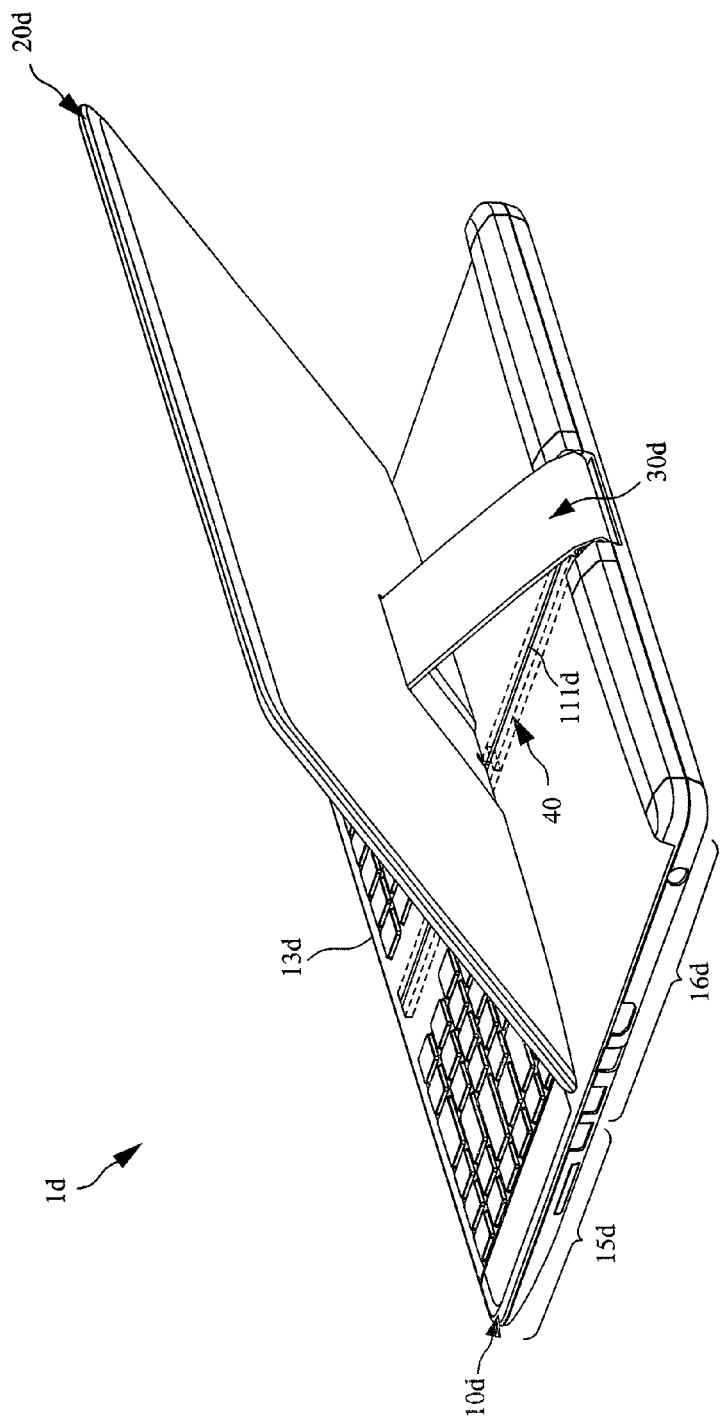
FIG. 15 illustrates a view of a fifth embodiment of the portable computer of the present invention.

Please refer to FIG. 15 for a view of a fifth embodiment of the portable computer 1d of the present invention. The moving distance of the sliding assembly and the length of the corresponding slit can be adjusted according to various design needs. As shown in FIG. 15, in this embodiment, the sliding assembly 40 of the portable computer 1d and a corresponding slit 111d extend from a second area 16d of a base 10d to a first area 15d of the base 10d for extending a sliding distance of a display module 20d and increasing a range of the tilted angle of the display module 20d. In addition, the display module 20d can lie flat on the base 10d to enhance the versatility and capability of the portable computer 1d. Based on applications and user requirements, the user can choose to extend the sliding assembly 40 and the corresponding slit 111d part or all of the way (that is, approaching the position of a first end 13d) of the first area 15d, and the extended slit can have any characteristics shown in FIG. 13(a) to FIG. 14 or their combination.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A portable computer, comprising:
   a base comprising, between a front end and a rear end, a first area disposed at a front side of the base and a second area disposed at a rear side of the base;
   a display module comprising a connecting end, a display face, and a support plane opposite to the display face; and
   at least one supporting element, each supporting element comprising a first fixed end and a second fixed end, the first fixed end being pivotally connected to a portion of the display module other than the display face such that the display module is able to rotate relative to the supporting element; the second fixed end being pivotally connected to the rear end of the base or a proximity of the rear end of the base such that the supporting element is able to rotate relative to the base; and
   at least one sliding assembly, each sliding assembly comprising:
      a sliding guide structure disposed at least in the second area of the base;
      a sliding element combined with the connecting end of the display module and sliding along the sliding guide structure; and
      at least one auxiliary sliding device disposed between at least one side of the sliding element and at least one side of the sliding guide structure, such that the at least one side of the sliding element does not directly contact the at least one side of the sliding guide structure such that friction between the sliding element and the sliding guide structure is reduced.

2. The portable computer as claimed in claim 1, wherein the sliding guide structure is integrated with the base.

3. The portable computer as claimed in claim 1, wherein the sliding element comprises a pivoting portion, a sliding portion, and a connecting portion, the connecting end of the display module being pivotally connected to the sliding element via the pivoting portion; the sliding portion is connected to the pivoting portion via the connecting portion; the sliding portion is disposed within the sliding guide structure.

4. The portable computer as claimed in claim 3, wherein the base further comprises a plane having a slit; the sliding guide structure is disposed below the plane corresponding to the slit, and the connecting portion of the sliding element passes through the slit such that the pivoting portion and a portion of the connecting portion protrude out of the plane; the slit has a width smaller than that of the sliding portion.

5. The portable computer as claimed in claim 1, wherein the sliding guide structure further comprises a bottom surface and two symmetric internal side surfaces, and the plane further comprises an under surface; each internal side surface is connected respectively to the bottom surface and the under surface such that a groove-like space is formed for disposing the sliding portion; and the sliding portion comprises an outer surface.

6. The portable computer as claimed in claim 5, wherein the at least one auxiliary sliding device is disposed into the groove-like space, and the at least one auxiliary sliding device is connected to at least one of the bottom surface, the two internal side surfaces and the under surface; a sliding groove is formed by the sliding portion combining with the at least one auxiliary sliding device such that the sliding portion can slide in the sliding groove.

7. The portable computer as claimed in claim 5, wherein the at least one auxiliary sliding device is combined with the outer surface of the sliding surface.

8. The portable computer as claimed in claim 5, wherein the at least one auxiliary sliding device comprises a first auxiliary sliding device and a second auxiliary sliding device, the first auxiliary sliding device being combined with the outer surface of the sliding surface; the second auxiliary sliding device is disposed into the groove-like space and is connected to at least one of the bottom surface, the two internal side surfaces and the under surface; a sliding groove is formed by the sliding portion combining with the first auxiliary sliding device such that the sliding portion can slide in the sliding groove.

9. The portable computer as claimed in claim 5, wherein the at least one auxiliary sliding device comprises a first auxiliary sliding device and a second auxiliary sliding device, and the outer surface comprises a top face and a bottom face; the first auxiliary sliding device is combined with one of the top face or the bottom face; the second auxiliary sliding device is disposed into the groove-like space and a sliding groove is formed by the sliding portion combining with the first auxiliary sliding device such that the sliding portion can slide in the sliding groove.

10. The portable computer as claimed in claim 9, wherein the first auxiliary sliding device is combined with the bottom face of the sliding portion, and the second auxiliary sliding device is connected to at least one of the two internal side surfaces of the sliding guide structure and the under surface.

11. The portable computer as claimed in claim 9, wherein the first auxiliary sliding device is combined with the top face of the sliding portion, and the second auxiliary sliding device is connected to at least one of the two internal side surfaces and the bottom surface of the sliding guide structure.

12. The portable computer as claimed in claim 1, wherein the sliding portion is a sliding element structure.

13. The portable computer as claimed in claim 1, wherein the at least one auxiliary sliding device is made of polyoxymethylene (POM), nylon or plastic.

14. The portable computer as claimed in claim 1, wherein the first area is disposed with a keyboard.

15. The portable computer as claimed in claim 8, wherein the second auxiliary sliding device further has a sliding groove corresponded to the slit and communicated with the sliding groove.

16. The portable computer as claimed in claim 9, wherein the second auxiliary sliding device further has a sliding groove corresponded to the slit and communicated with the sliding groove.

17. The portable computer as claimed in claim 4, wherein the surface having the slit comprises the second area and at least part of or all of the first area; and the sliding guide structure is disposed correspondingly below the surface comprising the second area and at least part of or all of the first area.

18. The portable computer as claimed in claim 1, wherein the at least one supporting element comprises two support elements arranged in parallel.

19. The portable computer as claimed in claim 1, wherein the at least one sliding assembly comprises two sliding assemblies parallel to each other and spaced apart, the two sliding guide structures are disposed in parallel at least in the second area, and each sliding element is respectively and pivotally connected to the connecting end of the display module corresponding to each sliding guide structure.

* * * * *